July 24, 1928.
P. J. THOMAS
PRONG CLEARING FORK
Filed Aug. 10, 1926
1,678,368
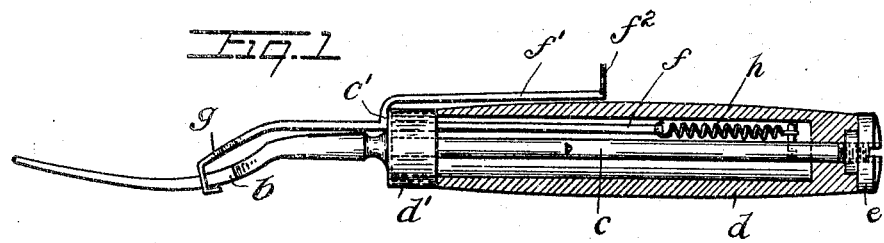
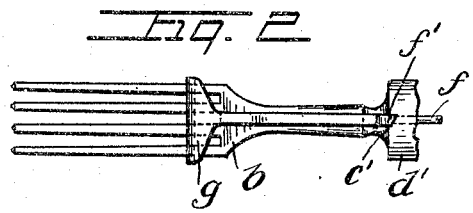
Pacific J. Thomas
INVENTOR.
BY
ATTORNEYS Patented July 24, 1928.

1,678,368

UNITED STATES PATENT OFFICE.

PACIFIC J. THOMAS, OF WYOMING, PENNSYLVANIA.

PRONG CLEARING FORK.

Application filed August 10, 1926. Serial No. 128,378.

My invention relates to forks which comprise a push-off means slidable on the prongs so as to conveniently disengage articles impaled on the latter, as for culinary purposes; and it consists in the improved construction hereinafter fully described in connection with the accompanying drawings, the novel features being clearly defined in the subjoined claim.

Fig. 1 is an edge view of a fork construction embodying my invention in preferred form; the handle being shown in longitudinal section. Fig. 2 is a partial plan view of the same.

My improved construction comprises pronged member $b$ as usual, having a shank extension $c$ which passes through and is secured to a handle $d$, as by means of an end nut $e$. In my improved construction the longitudinal opening in the handle $d$ is enlarged so as to also receive the shank portion $f$ of a fork-clearing or push-off device $g$ slidably engaged upon the prongs of the fork; said shank portion $f$ of the push-off device, as shown, having its main portion extending into the handle through the ferrule $d'$, but being provided with a parallel exterior leg $f'$ having an actuating offset or finger $f^2$. The main shank portion $f$, of the push-off device is connected by handle-enclosed spring $h$, to the fixed shank $c$ of the fork, so that the device will be normally retracted thereby against a suitable stop or shoulder $c'$ but may be readily projected by means of the actuating exterior finger.

In my improved construction it will be seen that the handle snugly encloses the shanks of both the fixed fork and the slidable push-off device, as well as the retracting spring for the latter, thus providing a very neat-appearing and satisfactory article. The preferred construction specifically set forth may be readily modified without departing from the main invention.

What I claim is:

In combination with a pronged fork having a rearwardly extending shank and a separate handle enclosing the latter, a fork clearing member slidable upon said prongs and having a U-shaped shank portion the shorter leg of which lies outside of and substantially parallel to said handle and is provided with an actuating finger, and the longer leg of which is enclosed by said handle and provided with a spring connection to said fork shank.

In testimony whereof I affix my signature.

PACIFIC J. THOMAS.